US006401784B1

(12) United States Patent
Bigot et al.

(10) Patent No.: US 6,401,784 B1
(45) Date of Patent: Jun. 11, 2002

(54) TOOL FOR SHEATHING A BUNDLE

(75) Inventors: Henri Bigot, Creteil; Bruno Garin, Sainte-Genevieve des Bois, both of (FR)

(73) Assignee: Coroplast Fritz Muller GmbH & Co. KG (DE)

(*) Notice: Subject to any disclaimer, the term of this patent is extended or adjusted under 35 U.S.C. 154(b) by 1 day.

(21) Appl. No.: 09/689,007

(22) Filed: Oct. 12, 2000

(30) Foreign Application Priority Data

Oct. 13, 1999 (FR) ........................................... 99 12764

(51) Int. Cl.[7] ............................................... B32B 31/00

(52) U.S. Cl. ....................... 156/465; 156/468; 156/553; 156/555; 156/582

(58) Field of Search ................................ 156/443, 459, 156/461, 464, 465, 466, 468, 475, 538, 539, 553, 555, 582

(56) References Cited

U.S. PATENT DOCUMENTS 4,502,905 A * 3/1985 Jung et al. .................. 156/443
5,620,540 A * 4/1997 Bigot et al. ................. 156/443

* cited by examiner

*Primary Examiner*—James Sells
(74) *Attorney, Agent, or Firm*—Kilpatrick Stockton LLP

(57) ABSTRACT

The invention relates to a tool for sheathing a bundle of elongate elements by wrapping said bundle in a flexible adhesive tape which is wrapped transversely to its long direction about the bundle and which has longitudinal margins that are united by adhesive, the tool comprising a shaping member for shaping the tape, which member comprises a sleeve of substantially circular cross-section that possesses a sloping end portion forming a deflector edge, and remote from the point where the tape reaches it, a longitudinal slot through which the longitudinal margins of the tape pass, the sleeve having at least one longitudinal hinge to enable it to be opened and to enable the tape to be put into place therein.

4 Claims, 2 Drawing Sheets

TOOL FOR SHEATHING A BUNDLE

The present invention relates to a tool for sheathing a bundle of elongate elements, such as a bundle of tubes or of electric cables, and in particular a bundle of the type used in the manufacture of motor vehicles.

BACKGROUND OF THE INVENTION

In the automotive field, electric wiring is generally prepared as one or more harnesses of wires assembled on a mounted jig with the wires being held together by means of adhesive ties or split rings of plastics material, after which the resulting assembly is covered in a sheath of split and ringed plastics material, or adhesive tape is wound around it, or it is received in adhesive tape that extends lengthwise and is wrapped transversely onto it.

Thus, document WO-A-97/26664 discloses a tool for sheathing a bundle by wrapping the bundle in a flexible adhesive tape, e.g. of polyurethane foam or of baize, extending lengthwise and wrapped transversely to itself around the bundle, with the longitudinal edges thereof being united by adhesive. The tool has a member for shaping the tape, which member has a V-shaped cross-section and causes the tape to being to be wrapped transversely around the bundle which is placed in the bottom of the V-shaped strip formed by the tape passing over the member. The bundle and the tape extend along different directions before being united (generally at 90° to each other) and the shaping member possesses a deflector edge that is likewise V-shaped enabling the direction of incidence of the tape to be modified by causing it to change direction at the location where it meets the bundle while limiting deformation of the tape. Nevertheless, when the tape is broad (e.g. 100 millimeters wide) or thin, the tape tends to sag in the bottom of the V of the shaping member and to form wrinkles.

OBJECTS AND SUMMARY OF THE INVENTION

There thus exists a need which has not yet been resolved conveniently for a sheathing tool of the above-specified type which provides good quality sheathing with most adhesive tapes, and in particular those that are relatively broad or thin.

To this end, according to the invention, a shaping member comprises a sleeve of substantially circular cross-section that possesses a sloping end forming the deflector edge, and opposite to the point where the tape arrives therein, a longitudinal slot through which the longitudinal margins of the tape pass, the sleeve having at least one longitudinal hinge to enable it to be opened and to enable the tape to be put into place therein.

Thus, when the tape is put into place in the shaping member and the tape is folded against the deflector edge, the tape is held on the portions of the deflector edge adjacent to the slot, which portions converge towards each other. This limits the risk of the tape sagging.

Advantageously, the longitudinal slot has edges which are extended out from the sleeve by tongues. The tape that has been put into place in the shaping member is folded against the tongues which improve the holding of the tape against the deflector edge.

BRIEF DESCRIPTION OF THE DRAWINGS

Other characteristics and advantages of the invention will appear on reading the following description of particular non-limiting embodiments of the invention.

Reference is made to the accompanying drawings, in which.

MORE DETAILED DESCRIPTION

Figure 1:
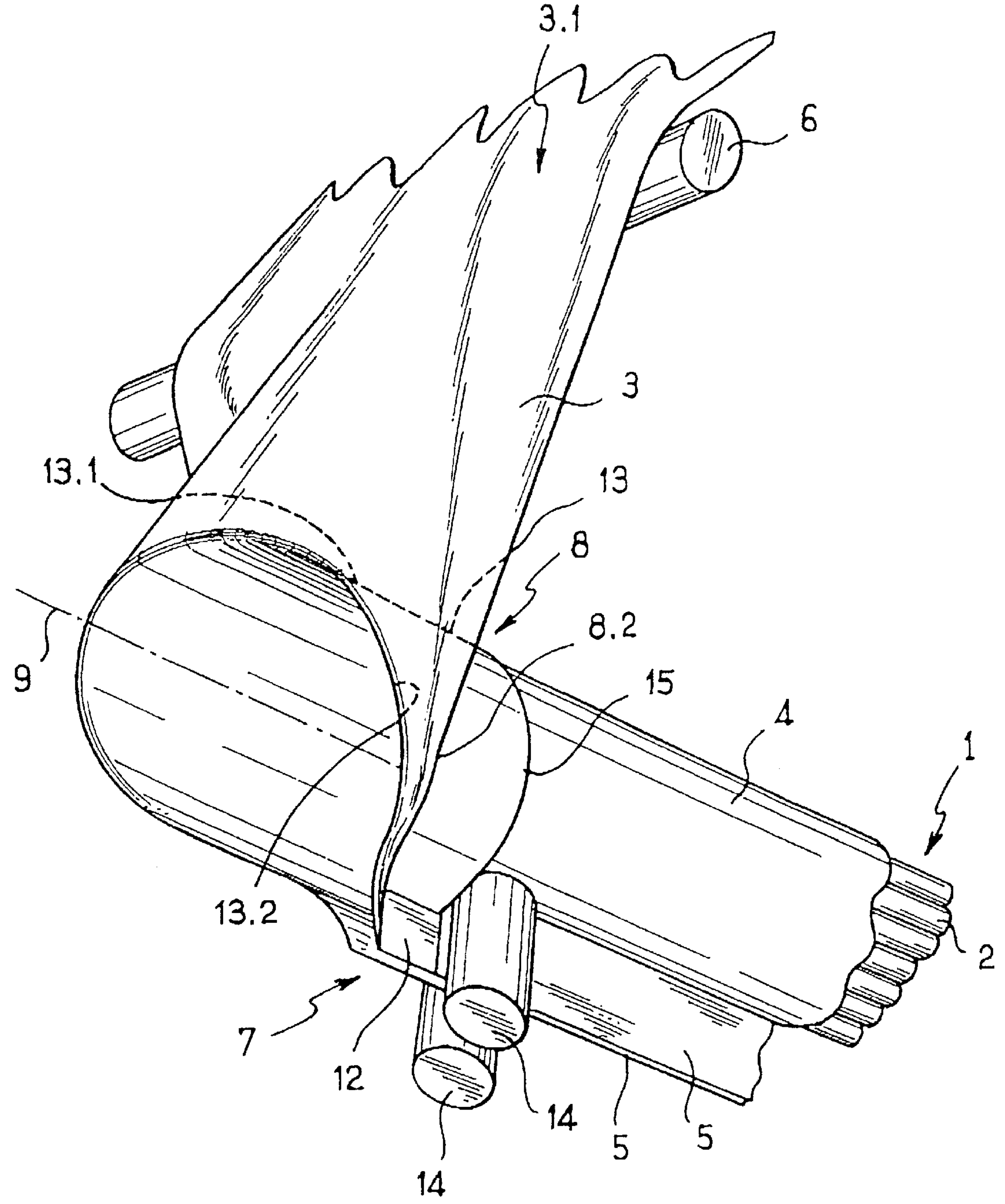
FIG. 1 is a fragmentary diagrammatic perspective view of a tool of the invention.
Figure 2:
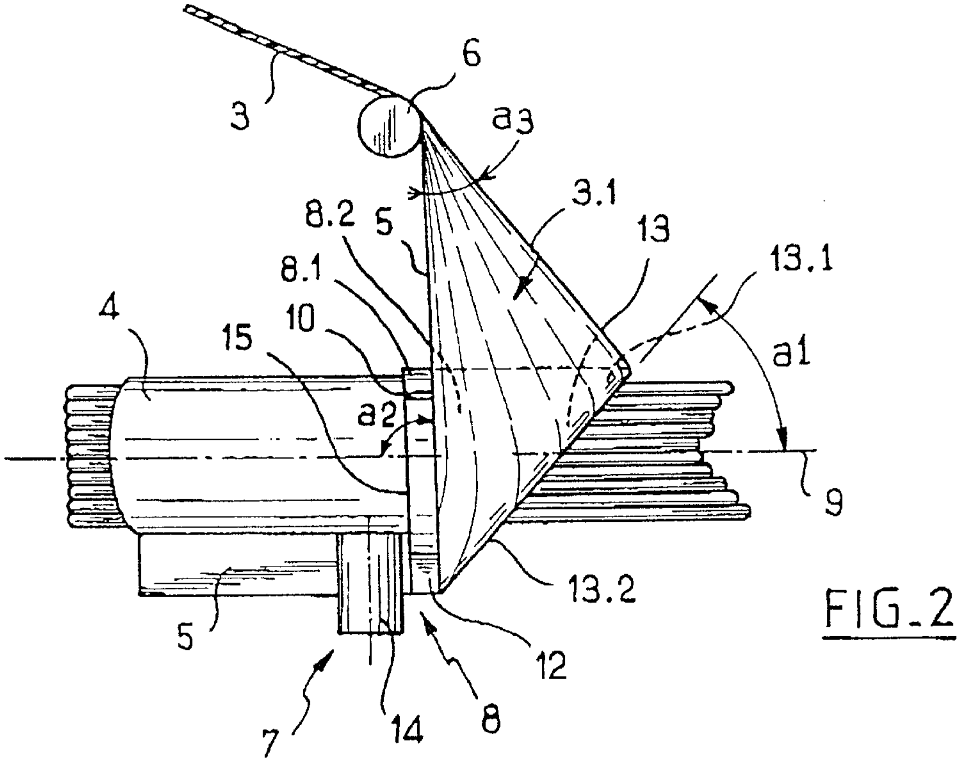
FIG. 2 is an elevation view of the tool of the invention while sheathing a bundle.
Figure 3:
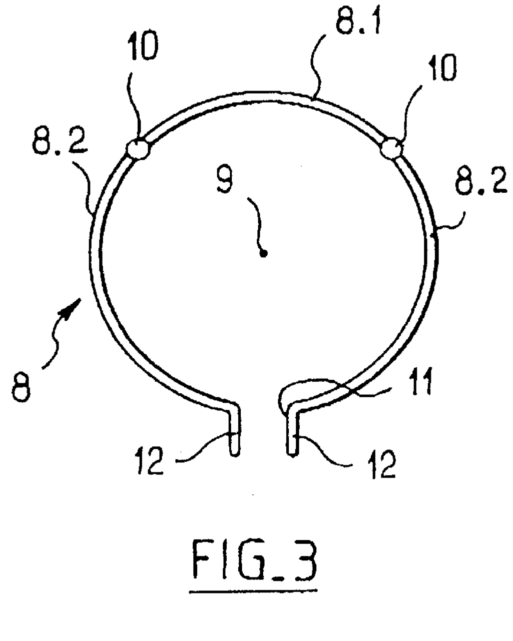
FIG. 3 is a front view of the shaping member of the invention.

With reference to FIGS. 1 to 3, the tool of the invention is intended to sheath a bundle 1 of elongate elements 2, such as electric cables, by means of a tape 3 which has an adhesive face 3.1. Sheathing is performed by wrapping the tape 3 transversely to is long direction around the bundle 1 so as to envelop it, with the adhesive face 3.1 being placed against the bundle 1, and starting from tape which is initially in the open configuration which the tape presents on leaving a reel from which it is taken. The tape 3 then has a longitudinal portion 4 wrapped around the bundle 1 to form a sheath, and its longitudinal margin 5 are pressed one against the other and stuck together via their adhesive faces 3.1.

The tape 3 can be made of any flexible material, i.e. not only polyethylene foam, baize, or the like as is commonly used for sheathing by transverse wrapping, but also any other material that is finer (polyvinyl chloride, woven or non-woven fibers, etc.) of the kind commonly used for sheathing by winding helically.

The tool of the invention comprises a frame (not shown) in which there are mounted a device of conventional type for feeding the tape 3 and associated with a guide roller 6 and a wrapping head given overall reference 7 which serves to wrap the bundle 1 in the tape 3.

The wrapping head 7 comprises a shaping member for shaping the tape 3, which member comprises a sleeve 8 of inside cross-section that is substantially circular, having a longitudinal axis 9 that is substantially perpendicular to the guide roller 6.

The sleeve 8 has a central portion 8.1 which is fixed and forms a trough which extends adjacent to the guide roller 6 and which is connected to two side flaps 8.2 via respective longitudinal hinges 10. The sleeve 8 is associated with opening and closing jaw means of conventional type (not shown in the figures) to enable the flaps 8.2 to pass between an open position of the sleeve 8 in which the flaps 8.2 are spaced apart from each other and a closed position of the sleeve 8 (shown in FIGS. 1 to 3) in which the flaps 8.2 are brought close together, in which they curve on continuously from the trough 8.1, and in which their free edges define a longitudinal slot 11 that is remote from the guide roller 6. The free edges of the flaps 8.2 are extended by respective tongues 12 which extend away from the central portion 8.1 when the sleeve 8 is in its closed position.

The sleeve 8 (including the tongues 12) has a sloping leading edge 13 whose tip (tapering end portion) 13.1 is situated on the central portion 8.1 on the side of the sleeve 8 that faces the guide roller 6. The chamfered end portion 13 has an edge 13.2 occupying a plane which in this case is at an angle a1 of about 45° to the longitudinal axis 9.

The wrapping head 7 also has two presser wheels 14 disposed behind the sleeve 8 in the travel direction of the bundle 1 through the wrapping head 7 and on either side of the longitudinal slot 11, so as to revolve facing each other about respective axes that are perpendicular to the longitudinal axis 9 of the sleeve 8. Each presser wheel 14 is fixed to the end 15 of the sleeve 8 opposite from its end portion 13 by means that are not shown, such as respective forks secured to each of the flaps 8.2 and receiving the axle of the corresponding presser wheel.

The bundle 1 is sheathed using the above-described tool of the invention in the following manner. The tape 3 is initially placed in the feeder device, and then the tape 3 is engaged over the guide roller 6, over the edge 13.2, and through the sleeve 8 while it is held open in such a manner that the adhesive face 3.1 of the tape 3 looks towards the inside of the sleeve 8. The tape 3 is then folded over the edge 13.2 which forms a deflector edge.

After one end of the bundle 1 has been inserted into the sleeve 8, the sleeve 8 is closed. The tape 3 is then in the shape of a split tube around the bundle 1 and the longitudinal margins 5 of the tape 3 pass through the longitudinal slot 11 and extend along the tongues 12.

The sleeve 8 is preferably positioned relative to the guide roller 6 in such a manner that firstly the positions of the longitudinal margins 5 of the tape 3 situated between the guide roller 6 and the deflector edge 13.2 form an angle a2 of about 90° relative to the longitudinal axis 9 of the sleeve 8, and that secondly the portion of the middle line of the tape 3 extending from the guide roller 6 to the tip 13.1 and the above-mentioned portions of the longitudinal margins 5 of the tape 3 form an angle a3 of about 30°. This configuration provides optimum shaping of the tape.

The sheathing operation is continued by causing the tool and the bundle 1 to be move relative to each other. The longitudinal margins 5 of the tape 3 then pass between the presser wheels 14 which press the adhesive surfaces 3.1 of these margins against each other.

It will be observed that the arrangement of the shaping member as described herein imparts particularly simple structure to the sheathing tool of the invention.

Elements identical or analogous to those described above are given identical numerical references in the description below of a variant embodiment of the sleeve 8.

Figure 4:
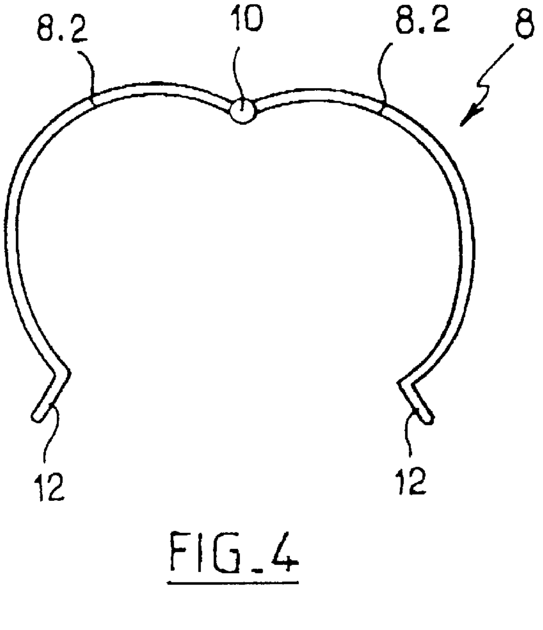
FIG. 4 is a view analogous to FIG. 3 showing a variant embodiment of the shaping member.

In this variant which is shown in FIG. 4, the sleeve 8 has two side flaps 8.2 which are directly connected to each other via a hinge 10 situated adjacent to the guide roller (the sleeve 8 is shown in the open position in this Figure). This hinge can be an articulated hinge or it can be deformable.

In this case, the flaps 8.2 are curved so that when the sleeve 8 is in the closed position, its inside cross-section is substantially oval with is major axis extending between the hinge 10 and the slot. More precisely, the inside cross-section is egg-shaped with its tapering portion going away from the hinge 10.

Naturally, the invention is not limited to the embodiment described above, but on the contrary covers any variant using equivalent means to reproduce its essential characteristics.

In particular, the presser wheels that press the longitudinal margins 5 against each other could be mounted on a pair of jaws that are independent from the sleeve 8. The presser wheels could also be motor driven.

What is claimed is:

1. A tool for sheathing a bundle of elongate elements by wrapping the bundle in a flexible adhesive tape that is wrapped transversely to its long direction around the bundle and whose longitudinal margins are united by adhesive, the tool comprising a shaping member for shaping the tape, which shaping member possesses a deflector edge extending in a plane that is inclined relative to the direction the tape arrives in the shaping member and to the longitudinal direction of the bundle, wherein the shaping member comprises a sleeve of substantially circular cross-section that possesses a sloping end forming the deflector edge, and opposite to the point where the tape arrives therein, a longitudinal slot through which the longitudinal margins of the tape pass, the sleeve having at least one longitudinal hinge to enable it to be opened and to enable the tape to be put into place therein.

2. A sheathing tool according to claim 1, wherein the longitudinal slot has edges which are extended out from the sleeve by tongues.

3. A sheathing tool according to claim 1, having two presser wheels adjacent to the end of the sleeve opposite from its sloping end and mounted facing each other on either side of the longitudinal slot to press the longitudinal margins of the tape against each other.

4. A sheathing tool according to claim 3, wherein the presser wheels are secured to the end of the sleeve that is opposite from its sloping end portion.

* * * * *